United States Patent [19]
Heidt

[11] 3,836,177
[45] Sept. 17, 1974

[54] TRICYCLE

[76] Inventor: Peter C. Heidt, P.O. Box 163, Masonville, N.J. 08054

[22] Filed: Aug. 28, 1973

[21] Appl. No.: 392,226

[52] U.S. Cl.................. 280/269, 280/282, 280/95 R
[51] Int. Cl.............................................. B62k 5/08
[58] Field of Search ............ 280/269, 267, 282, 7.1, 280/7.15, 95 R

[56] References Cited
UNITED STATES PATENTS

| | | | |
|---|---|---|---|
| 381,763 | 4/1888 | Dearlove et al. | 280/267 |
| 842,833 | 1/1907 | Hedstrom | 280/269 X |
| 855,979 | 6/1907 | Razoux | 280/269 X |
| 1,471,749 | 10/1923 | Monroe | 280/267 |

FOREIGN PATENTS OR APPLICATIONS

| | | | |
|---|---|---|---|
| 11,090 | 1910 | Great Britain | 280/267 |

*Primary Examiner*—Robert S. Ward, Jr.
*Assistant Examiner*—Michael Mar

[57] ABSTRACT

The front wheel is removed from a bicycle, and a transverse axle is attached to the steering fork. The fork is in turn secured to the bicycle frame. A steering shaft connects the handle bars through the fork and head tubes to a pivotal joint with the axle. Tie rods translate force applied at the shaft to wheels which are pivotally disposed at the axle extremities.

2 Claims, 5 Drawing Figures

PATENTED SEP 17 1974 3,836,177

TRICYCLE

BACKGROUND OF THE INVENTION

This invention relates to cycling apparatus. More particularly, it relates to apparatus for converting bicycles into tricycles.

Recently, cycling has experienced a tremendous resurgence of popularity. Not surprisingly, corresponding increases in accident rates and safety problems have occurred. In particular, these increases may be at least partially attributed to the two-wheel construction of bicycles. Clearly, any distraction experienced by the rider is an invitation to an accident, since effective operation of the bicycle requires at least sufficient attention to maintain balancing thereof.

Another detrimental aspect of bicycles is that the rider must be fairly fit and alert in order to operate them effectively. For example, physically handicapped persons or senior citizens whose reactions have diminished somewhat, are precluded from cycling, an unfortunate result since the exercise and fresh air which accrues would otherwise be extremely beneficial to them.

One approach to the foregoing problems involved in use of bicycles has been the introduction of full-sized tricycles. Typical tricycles, which involve one wheel in the front and two in the back, are not only useful for those who would otherwise be unable to enjoy the pleasures of cycling, but futhermore, afford an effective pedal powered vehicle for load carrying, for passenger seats, or the like. The main features of tricycles are their exceptional stability, and concomitant operational safety.

While the demand for tricycles is by no means insubstantial, it is nonetheless far smaller than that for standard two-wheel bicycles. Consequently, mass production savings are relatively unavailable to tricycles, and the cost to the consumer is proportionately higher than for comparable bicycle models. Moreover, any conversion apparatus heretofore suggested has involved replacement of the rear wheel with a pair of rear wheels, thereby involving rather severe problems relative to relocation and reconstruction of the chain drive mechanisms. In the case of modern multiple speed bicycles, this conversion is practically impossible.

It is an object of the present invention to provide apparatus for effective and inexpensive conversion of bicycles into tricycles.

It is a further object of the present invention that the tricycle so produced be at least equivalent in strength and stability to prefabricated tricycles.

SUMMARY OF THE INVENTION

The present invention involves the conversion of standard bicycles into tricycles which have two wheels in the front and which retain the rear wheel and drive mechanism intact. In accordance with the principles of the present invention, the front wheel is removed from the steering fork, and apparatus is mounted in its place which includes a transverse axle with two wheels mounted thereon, and a steering mechanism between the handlebars of the bicycle and the axle. In a preferred embodiment, the two front wheels are identical to those normally used by the bicycle, thereby allowing for use of the front wheel from the bicycle in combination with a similar one obtained for purposes of conversion to a tricycle.

In an illustrative embodiment, an axle is mounted in a fixed position transverse to the steering forks of the bike, and is bolted onto the dropouts of the fork. A plate is mounted at the junction of the crown of the fork and the head tube of the bike, thereby locking the fork into position. A steering shaft is connected from the stem of the bike through the fork tube and downwardly to a plate. The two wheels are pivotally mounted at the extremities of the axle, and are connected to the plate by means of tie rods. Turning force on the handlebars of the bike is therefore transmitted by the steering shaft to the tie rods, which proportionally pivot the front wheels of the tricycle.

It is a feature of the present invention that a standard bicycle may be simply and inexpensively converted into a tricycle. Moreover, this conversion only involves the addition of axle apparatus which embodies the principles of the present invention and one additional tire and wheel identical to the two from the bicycle. What results is an exceptionally stable vehicle suitable for carrying loads safely, or the incorporation of passenger seats, such as for children.

DETAILED DESCRIPTION

Figure 1:
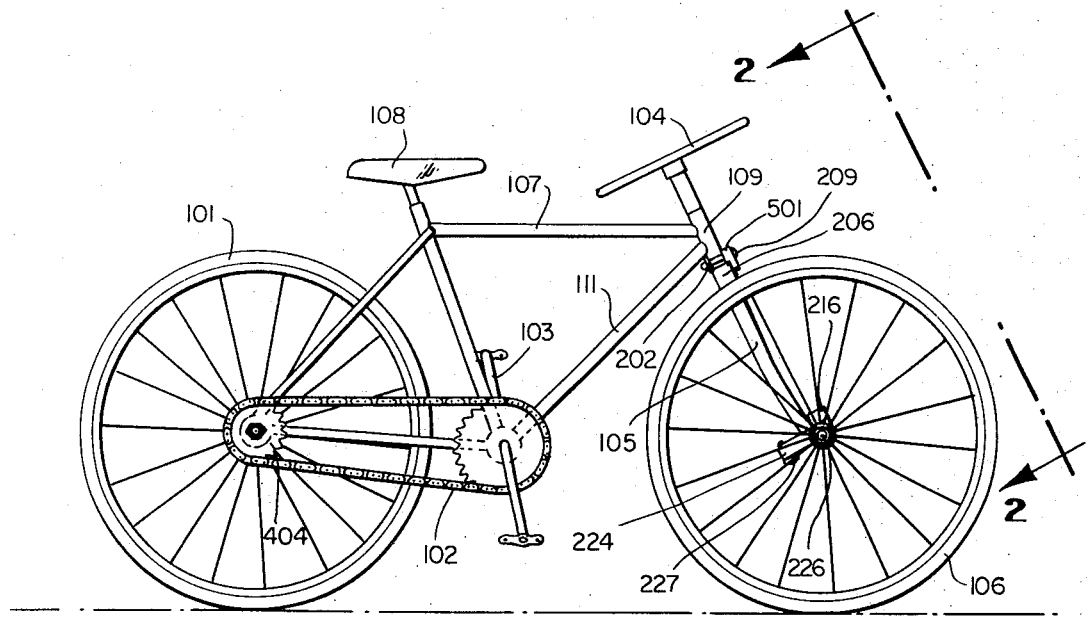
FIG. 1 shows a side view of a tricycle embodying the principles of the present invention.

In the embodiment of FIG. 1, a tricycle includes a standard bicycle frame. Hence, the top tube 107, the down tube 111, and the head tube 109 are intact from the bicycle from which it was converted. Likewise, the pedal arrangement with a chain 102 and a sprocket wheel 404 drive the rear wheel 101 as comparable apparatus drives all bicycles. The embodiment of FIG. 1 involves but a single sprocket wheel 404, but it is to be understood that any multiple wheel sprocket or gear changer apparatus could likewise be utilized, since it is a feature of the principles of the present invention that the only portion of the bicycle which is altered when converting it to a tricycle is the steering and front wheel mechanism. As may be seen from FIGS. 1 and 2, the bicycle also includes a fork assembly, including a crown of the fork 206 and right and left fork arms 105 and 205. In accordance with the principles of the present invention, however, the front wheel of the bike has been removed from the fork arms 105 and 205.

Figure 2:
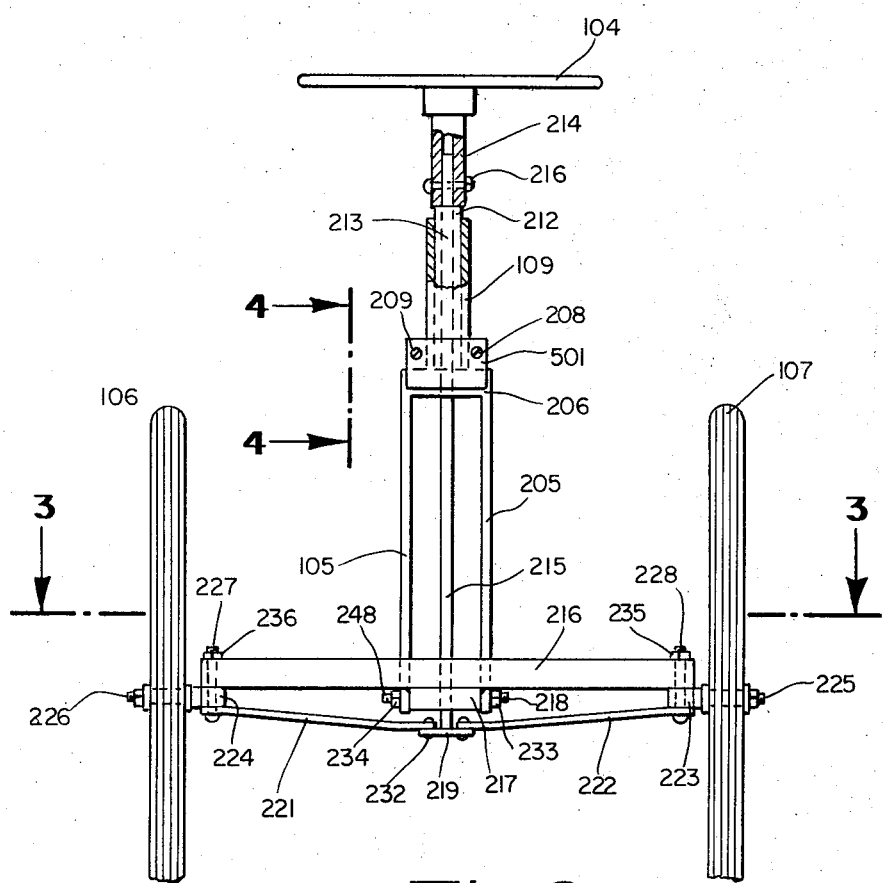
FIG. 2 shows a front view of the tricycle of FIG. 1.
Figure 4:
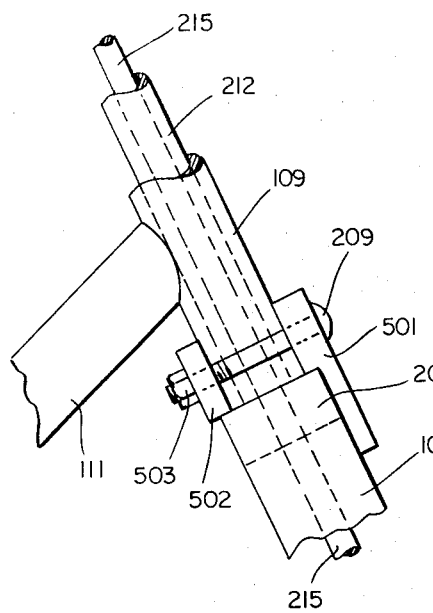
FIG. 4 demonstrates provision for steering mechanisms in accordance with the principles of the present invention.
Figure 5:
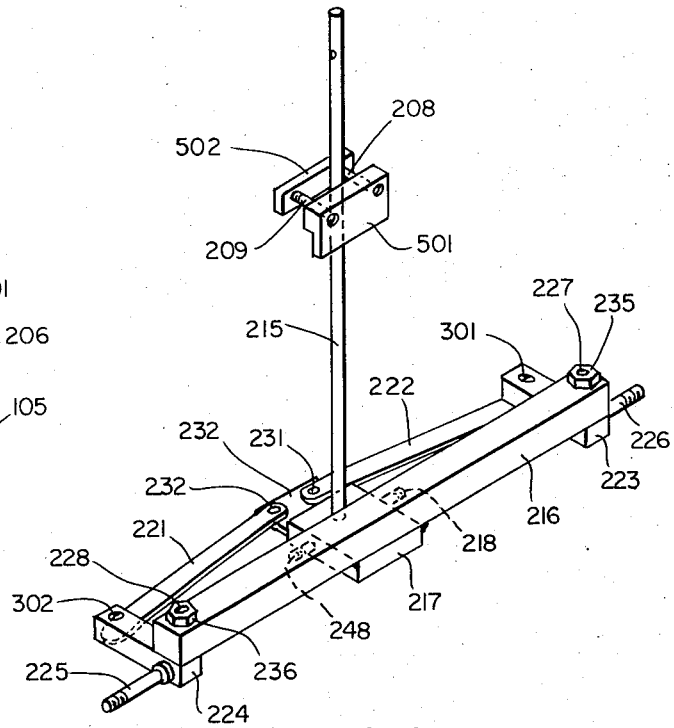

Prior to further discussion of the tricycle assembly of FIGS. 1 and 2, it is useful to separately view in detail, apparatus which embodies the principles of the present invention, and which is attached to the forks 105 and 205 of the bicycle in order effectively to convert it into a tricycle. FIGS. 4 and 5 show two different views of apparatus which embodies the principles of the present invention. A steering shaft 215 terminates in a plate or block 217. Attached to the block 217 is a transverse axle 216, to which the two front wheels of the tricycle are to be attached. Also protruding from block 217 are two pins 218 and 248, to which the fork arms 105 and 205 are to be attached. More particularly, the outward pins 218 and 248 are situated to fit into the dropouts of the fork arms 105 and 205, and to be tightened thereto by means of a pair of nuts 233 and 234. When the fork arms of the bicycle are thusly connected to the pins 218 and 248, there results a rigid connection of the main axle member 216 with the fork mechanism of the bike. Alternatively, a single bolt member penetrating the block 217 may be used to attach the axle 216 to the fork arms. At each end of the axle 216 there is attached by means of nut and pin connections 235 and 236 a pair of pivot arms 223 and 224. Protruding perpendicularly from the pivot arms are the stems 225 and 226 to which the wheels 106 and 107 are mounted.

The steering shaft 215 penetrates the block 217 and terminates with a fixed connection to an activating plate 219. A pair of tie rods 221 and 222 are pivotally connected both to the activating plate 219 and to the pivot bars 223 and 224. As shown in the figures, the tie rods 221 and 222 are connected by means of pivotable pins 302, 232, 231, and 301.

Any twisting force which is applied to the shaft 215 is therefore transferred to the actuating plate, rotating it by a fixed amount. For example, a clockwise force applied to shaft 215 causes similar movement in the actuating plate 219. In that situation, tie rods 221 and 222 are displaced toward the rider's left side, and pivot bars 223 and 224 are pivoted in a clockwise direction about their pivot points 227 and 228. Since mounting pins 225 and 226 are fixed perpendicularly to the pivot bars 223 and 224, rotation of the bars 223 and 224 in a clockwise direction about their pivot pins 227 and 228 causes the wheels 106 and 107 to be turned to the right. Hence, clockwise turning of the shaft 215 (i.e., corresponding to a turn to the right) causes the front wheels 106 and 107 similarly to turn. Counterclockwise turning of the shaft 215 causes corresponding displacement to the rider's right of the tie rods 221 and 222, counterclockwise pivoting of the bars 223 and 224, and twisting toward the left of the wheels 106 and 107.

Figure 3:
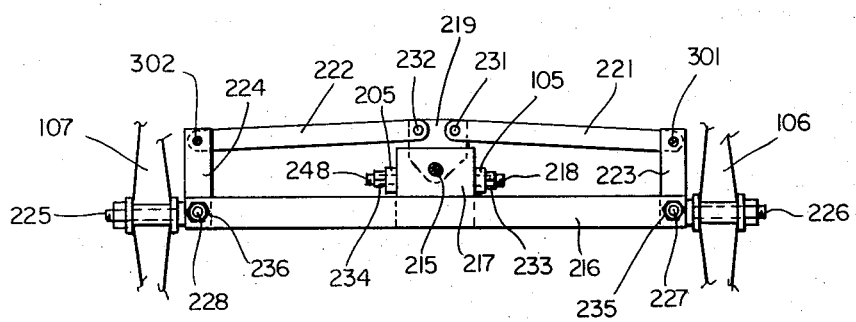
FIG. 3 and FIG. 5 show steering attachment apparatus which embodies the principles of the present invention.

The securement of the apparatus of FIGS. 3 and 5 to the frame of the bike to form a tricycle may be appreciated from consideration of FIGS 2 and 4. As disclosed hereinbefore, the dropouts of the fork arms 105 and 205 are affixed to the pin members 218 and 248 of block 217. As in normal bicycle construction, the fork arms 105 and 205 terminate in a transverse crown of the fork 206. In turn, extending from the crown 206 is a fork tube 212 which fits within the head tube 109 of the bike frame. In the normal construction, handlebars are rigidly attached to the fork tube 212 by means of an expander bolt which passes through a channel, generally designated 213, in the fork tube 212. The handlebars are therefore rigidly attached to the fork tube 212 and to the forks 105 and 205. Since the fork tube 212 pivots within the head tube 109, application of force to the handlebars is passed to the fork arms 105 and 205 and thence to the front wheel. In accordance with the principles of the present invention, steering is to be transferred directly from the handlebars to the tie rods 221 and 222 by means of the activating plate 219. Thus, it is necessary to secure the fork mechanism in a position pointing straight ahead. As shown in FIG. 4, this is accomplished by means of a stay plate 501 which forms a ledge about the crown 216 of the fork, and, when tightened against a back plate 502 by means of nuts and bolts 208 and 209, locks the fork assembly into place as shown. Since the stay plate 501 holds the fork crown 206 and the fork tube 212 in position, expander bolts are not needed, and may therefore be supplanted by the steering shaft 215. As shown in the drawing, the shaft 215 passes through the channel 213 in the fork tube 212, and upwardly to a stem or gooseneck 214. In turn, the stem 214 is rigidly attached to the steering shaft 215 by means of a crosspin 216, or the like. The embodiment shown in FIGS. 1 and 2 has a steering wheel for purposes of control, but it is to be understood that standard handlebars may as well be mounted on the stems 214 for purposes of steering.

In summary, conversion of a standard bicycle into a double front wheel tricycle may be accomplished in accordance with the principles of the present invention by a few brief steps. First, the front wheel is removed and the fork arms 105 and 205 are attached to a set of fixed pins 218 and 248. Then, the fork of the bike is locked into position by means of a stay plate 501, such that a steering shaft 215 fits through the channel 213 in the fork tube 212. Next, handlebars or a steering wheel are rigidly connected to the steering shaft. Finally, the tire and wheel assembly which was removed from the original bicycle configuration is mounted at one end of the axle 216, and a similar tire and wheel assembly is mounted at the other end of the axle 216.

It is to be understood that the foregoing embodiment is intended to be illustrative of the principles of the present invention, and that numerous alternatives may occur to those skilled in the art without departure from the spirit or scope thereof.

What is claimed is:

1. A tricycle comprising:
   a bicycle frame having a rear wheel, pedal drive apparatus, and a head tube in the front of said frame;

steering fork means rigidly attached to said frame and including a crown portion and fork arms depending downwardly from said crown portion, a fork tube extending upwardly from said crown portion and through said head tube, said shaft extending through said fork tube, and means for rigidly securing said steering fork means in a predetermined position relative to said frame;
   an axle attached transversely to and at the bottom of said fork arms;
   a shaft extending through said head tube and being pivotally attached to said axle;
   steering means attached at the top of said shaft;
   first and second wheels pivotally secured at either end of said axle; and
   first and second rods for pivoting said wheels in response to turning force applied to said shaft through said steering means.

2. A tricycle as described in claim 1 wherein said steering shaft terminates at its lower end in a plate, said first and second rods being pivotally attached to said plate.

* * * * *